Feb. 14, 1950         S. TERPAK         2,497,702
PRESSURE RESPONSIVE INDICATING DEVICE
Filed Nov. 17, 1948
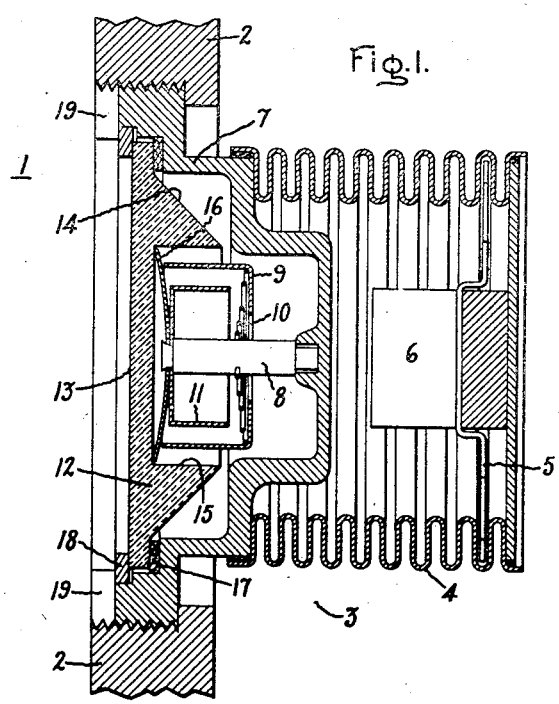
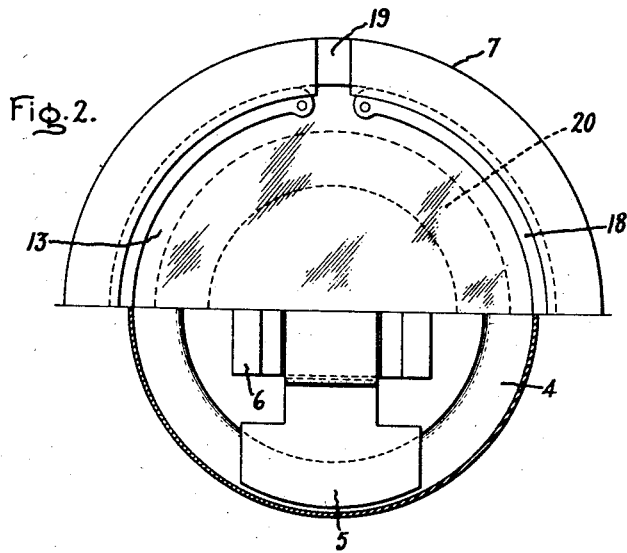
Inventor:
Stephen Terpak,
by Ernest C. Britton
His Attorney.

Patented Feb. 14, 1950

2,497,702

UNITED STATES PATENT OFFICE 2,497,702

PRESSURE RESPONSIVE INDICATING DEVICE

Stephen Terpak, Pittsfield, Mass., assignor to General Electric Company, a corporation of New York Application November 17, 1948, Serial No. 60,453

2 Claims. (Cl. 177—311)

This invention relates to indicating devices and more particularly to a magnetic pressure gauge.

In devices employing fluids or gases where these fluids or gases must be maintained at a pressure above a certain minimum value it is very often desired to have a device which will indicate each of two conditions; that the pressure is above the minimum value required or is below the minimum value required. That is, by way of example, a green color may be visible when the pressure is a safe value and when the pressure decreases to an unsafe value the green may be replaced by the danger signal red. It may operate with a snap-action and the present invention relates to a pressure indicator of this type. It should be stated that this device is in no way limited to the use herein disclosed but may be used wherever a snap-action type pressure indicator is needed.

In certain types of oil-filled insulating bushings a sealed pressure chamber is maintained within the bushing above the oil level. If the bushing seal is broken above the oil level the oil level will not change but the bushing is subject to the entrance of moisture and the concomitant decrease in the dielectric strength of the bushing internal insulation. It can be seen that as long as the gas within the bushing is maintained above a certain minimum pressure there will be no danger of the entrance of moisture into the bushing because the gas pressure will be greater than the atmospheric pressure. A preferred form of this invention employs a pressure responsive bellows which has a permanent magnet attached at one end. At safe gas pressures the bellows is contracted and the magnet attracts a danger indicator which is constructed of a magnetic material. As a result of this magnetic attraction, the indicator, which is slidably supported on a rod, is held against a barrier in opposition to the tension force of a spring. When the danger indicator is in this safe position a safety signal may be exposed to view. As the gas pressure drops the bellows expands carrying the permanent magnet with it and increasing the distance between the magnet and the danger indicator. When the attraction between the danger indicator and the magnet is so weakened that the attractive forces are overcome by the tension force of the spring the danger indicator snaps toward the front of the indicating device, exposing itself to view and covering the safety signal. It can be seen that there is no actual mechanical coupling between the bellows and the indicator. This eliminates the danger of either leakage of gas from the bellows or from the interior of the bushing. Also, the moving parts within this device have been reduced to a practical minimum; the bellows, the spring, and the slidably mounted danger indicator.

This invention has as an object the construction of a new and simple snap-action pressure indicating device.

Another object of this invention is to provide a pressure indicating device having no mechanical coupling between a pressure responsive bellows and the indicator.

The invention will be better understood from the following description taken in connection with the accompanying drawings and its scope will be pointed out in the appended claims.

In the drawing Fig. 1 is a cross-sectional view of a particular embodiment of the invention. Fig. 2 is a front elevation showing a portion of the device in a cutaway view.

Referring now to the drawing there is shown therein, by way of example, a magnetic pressure indicating device 1 which is mounted within the encasing structure 2 of a high voltage bushing the remainder of which is not illustrated. In the space 3 which surrounds the pressure responsive bellows 4 is a gas or fluid whose pressure it is desired to measure. Mounted within the bellows 4 is a bracket 5 which has a permanent magnet 6 fastened to it. The bellows 4 is secured at one end to a barrier 7 formed of a non-magnetic material and which, in the illustrated case, is screwed into the casing structure 2 of the high voltage bushing. Fastened to the barrier 7, and on the side opposite that of the bellows 4, may be a rod 8, which has slidably mounted on it a cup-shaped member 9 made of magnetic material and which may be painted red so as to indicate danger. The danger indicator 9 is forced to the left by the action of a spring 10 which is secured at one end to the shaft 8 and at the other end to the cup 9. As shown in Fig. 1, the spring 10 is in its rest position but when the bellows 4 is compressed the indicator 9 is held against the barrier 7 by the magnet 6, and the spring 10 is expanded. When the indicator 9 is held by the magnet 6 a second cup-shaped member 11, which may be painted green to indicate safety, is exposed to view. The cup-shaped member 11 may be fixedly mounted on the shaft 8.

Of interest is the means by which both cups 9 and 11 are viewed from the outside of the insulating bushing. A circular prismatic lens 12 of novel construction is utilized. The outer surface 13 of the lens 12 may be flat and the inner portion 14 may be considered to be a truncated cone.

The cone makes an angle of about 45 degrees with the plane surface 13. A cylindrical opening 15 is formed in the truncated cone portion 14 of the lens 12 and this opening accommodates the indicating cups 9 and 11. A diaphragm 16 mounted on the shaft 8 and fitting within the opening 15 serves to hold the shaft 8 as well as the indicating cups 9 and 11 in position. The 45 degree cone-shaped portion 14 of the lens 12, acting in co-operation with the cylindrical opening 15, allows for 360 degree viewing of the indicating cups 9 and 11. That is, the outer cylindrical surfaces of the cups 9 and 11 may be seen. The lens 12 is mounted within the barrier 7 by means of the gasket 17 and the mounting ring 18. The slots 19 are for receiving a spanner wrench when the device is screwed in place in the housing 2.

The pressure indicating device illustrated in the figure, operates in a simple and foolproof way. When the pressure within the space 3 is above the minimum safe value the bellows 4 is contracted and the magnet 6 holds the red indicating cup 9 out of sight. Thus the green indicating cup 11 is revealed, and, viewed through the prismatic lens 12, a green ring 20 will be seen indicating safe operating conditions. As the gas pressure within the space 3 decreases the bellows 4 expands. The distance between the permanent magnet 6 and the indicating cup 9 also increases and when the tension force of the spring 10 is great enough to overcome the attractive forces present the red indicating cup 9 snaps into a position covering the green indicating cup 11, thus a red ring 20 becomes visible through the prismatic lens 12. This then indicates that the gas pressure within the space 3 has reached a low dangerous value which will allow moisture to enter the high voltage bushing. When the danger signal is given, corrective steps may be taken to determine the location of the gas leak.

While there has been shown and described a particular embodiment of this invention it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. An indicating device including, a pressure responsive bellows having one fixed end secured to a non-magnetic barrier and one movable end, said movable end of said bellows having a permanent magnet affixed thereto, a shaft secured to said barrier, said shaft lying on the longitudinal axis of and exterior to said bellows, said shaft having a first indicating member in the form of a cup fixedly mounted and a second indicating member slidably mounted thereon, said second indicating member being in the form of a larger cup concentric with and covering said first indicating member, said second indicating member being constructed of a magnetic material, a spring secured at one end to said shaft and at the other end to said second indicating member, said spring acting in opposition to the attractive forces between said magnet and said second indicating member, and means for rendering only the outer surface of said second indicating member externally visible when it covers said first indicating member, said second indicating member being retractable by the attractive force of said magnet to a position for uncovering and rendering visible the first indicating member.

2. An indicating device including, a pressure responsive bellows having one fixed end secured to a non-magnetic barrier and one movable end, said movable end of said bellows having a permanent magnet affixed thereto, a shaft secured to said barrier, said shaft lying on the longitudinal axis of and exterior to said bellows, said shaft having a first indicating member fixedly mounted and a second indicating member slidably mounted thereon, said second indicating member being concentric with and exterior to said first indicating member, said second indicating member constructed of a magnetic material, a spring secured at one end to said shaft and at the other end to said second indicating member, said spring acting in opposition to the attractive forces between said magnet and said second indicating member, means for viewing said indicating members, said means comprising a prismatic lens having the shape of a truncated cone, said truncated cone having a hollow portion formed therein symmetrically about the longitudinal axis of said truncated cone, said hollow portion of said truncated cone accommodating said indicating members and a portion of said shaft.

STEPHEN TERPAK.

REFERENCES CITED

The following references are of record in the file of this patent:

UNITED STATES PATENTS

| Number | Name | Date |
|---|---|---|
| 2,229,192 | Schulty | Jan. 21, 1941 |
| 2,473,581 | Ford | June 21, 1949 |